April 17, 1956 A. A. SCHULLER 2,742,158
PRESSURE FILTER WITH VIBRATING DEVICE
FOR USE IN BACK WASHING OPERATION
Filed Aug. 29, 1952 4 Sheets-Sheet 1

Inventor.
Arthur A. Schuller
By Fred Gerlach
Atty.

April 17, 1956  A. A. SCHULLER  2,742,158
PRESSURE FILTER WITH VIBRATING DEVICE
FOR USE IN BACK WASHING OPERATION
Filed Aug. 29, 1952  4 Sheets-Sheet 2
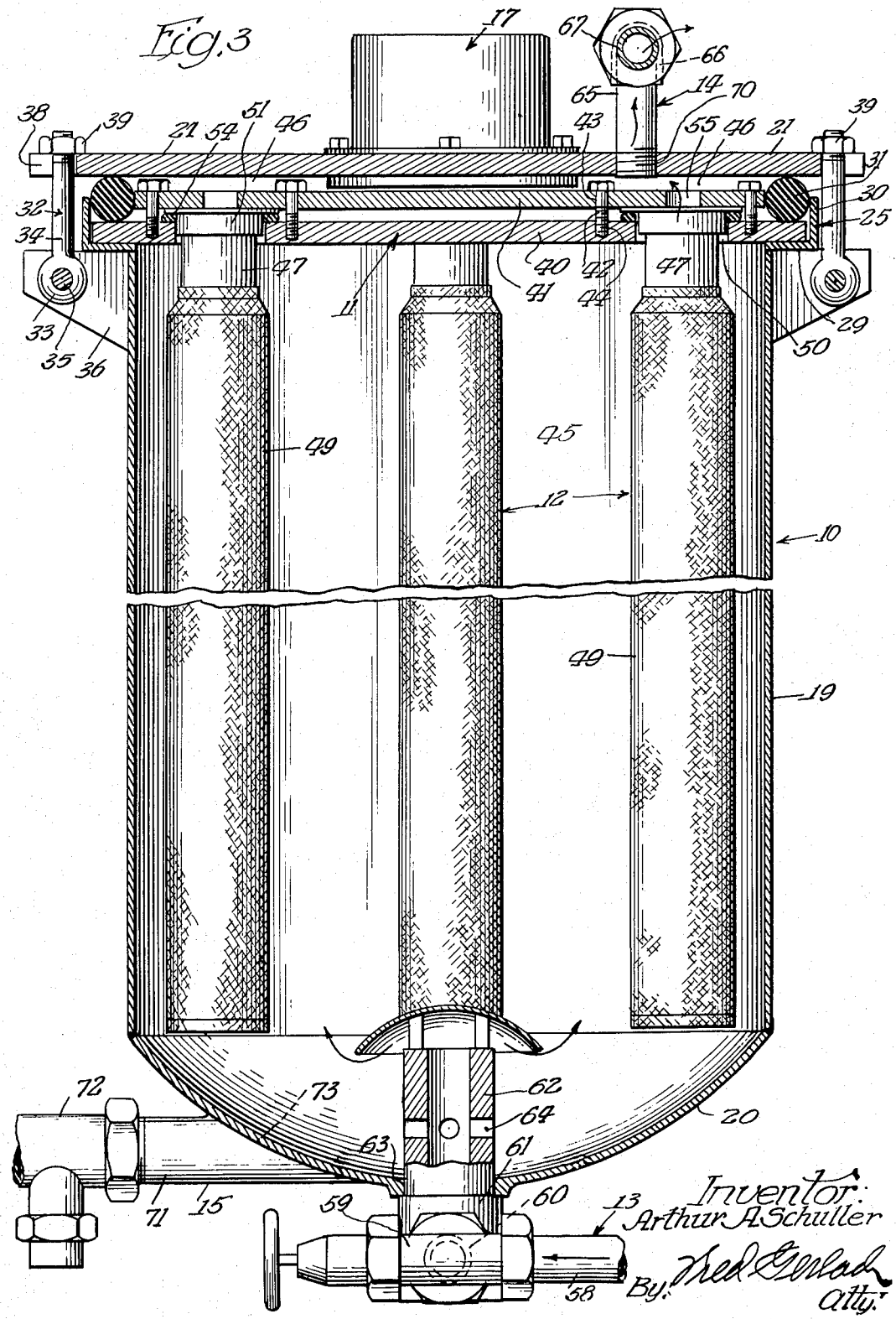

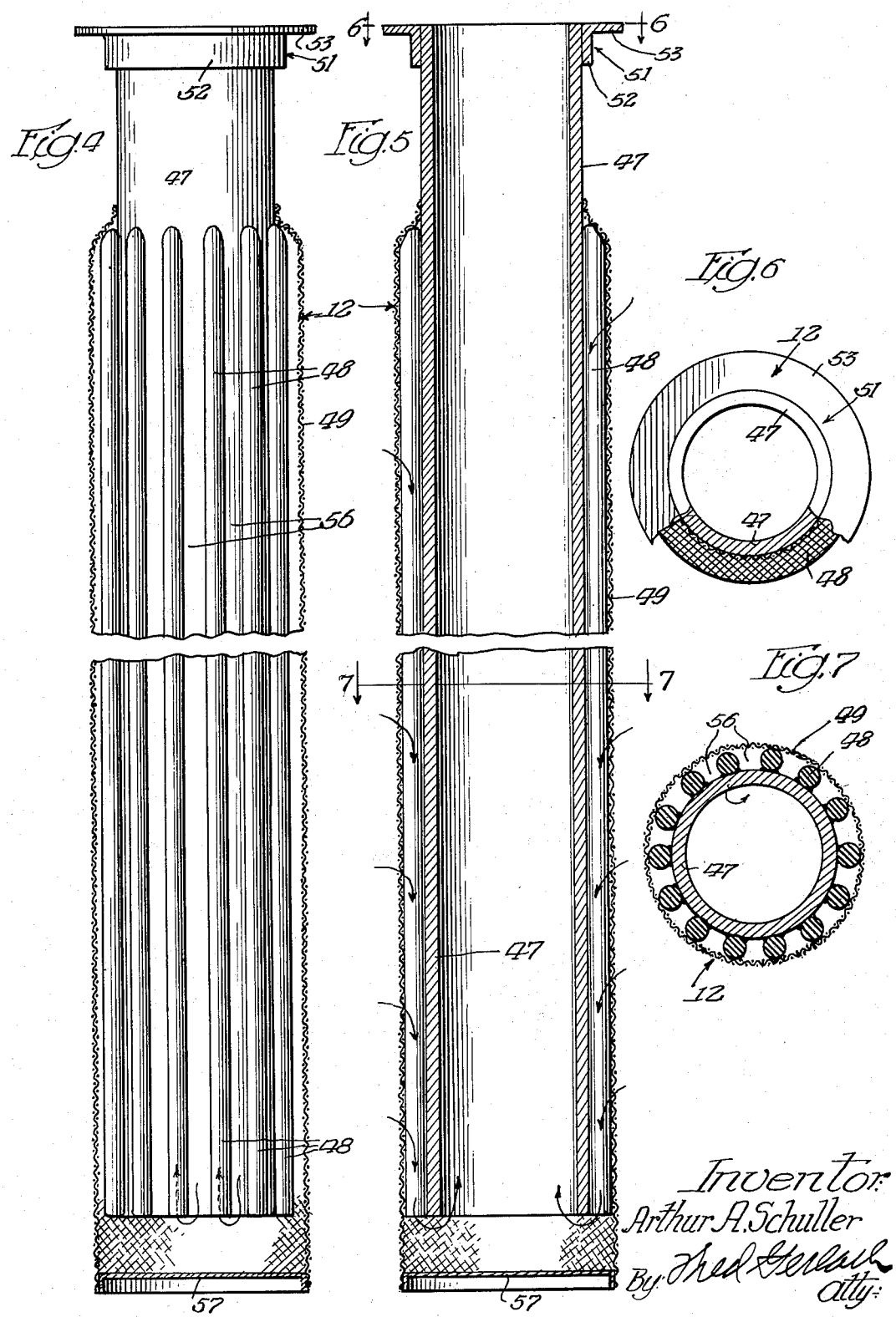

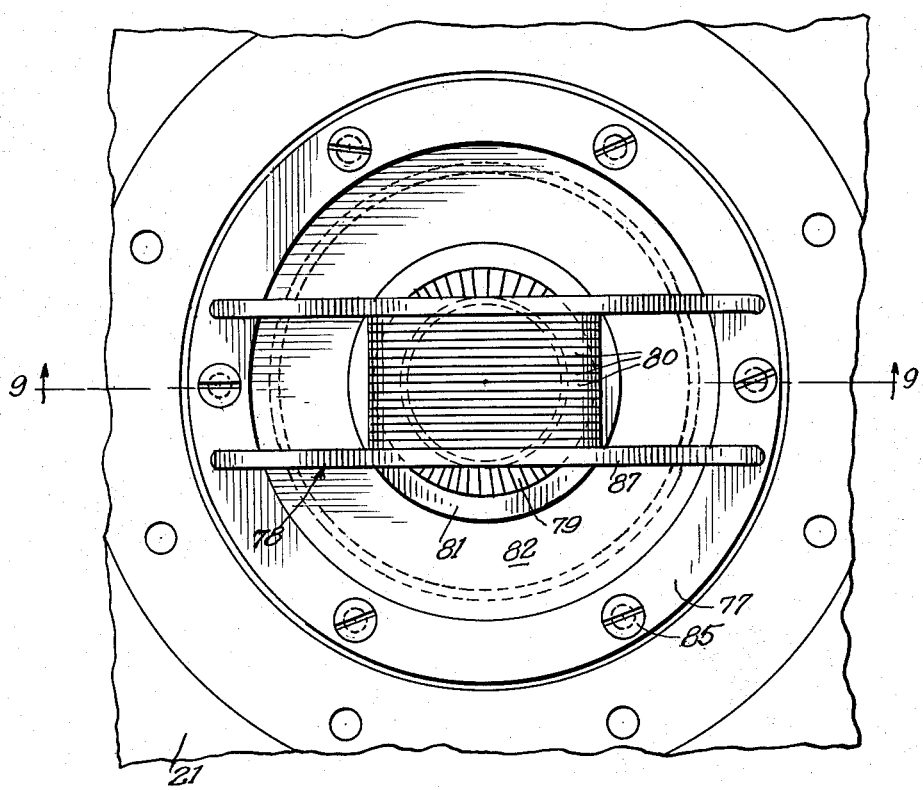
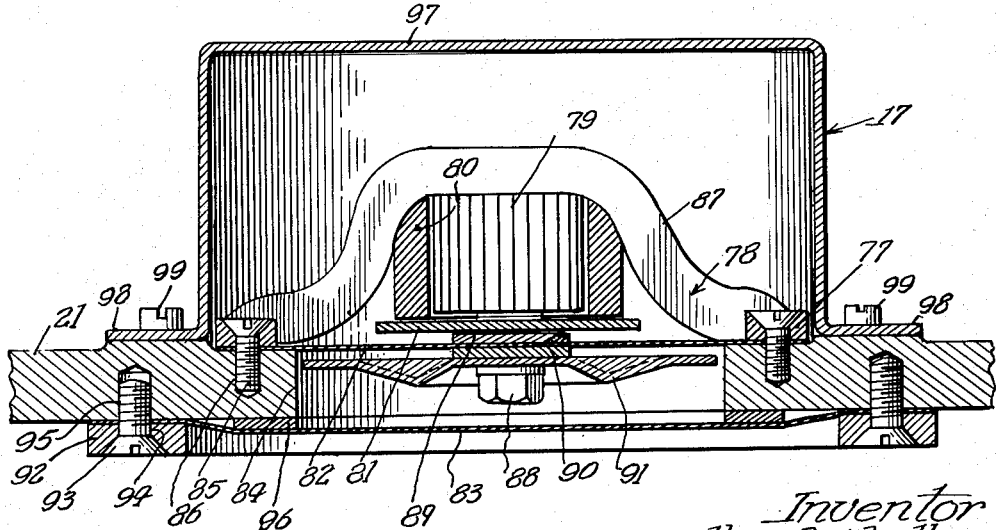

United States Patent Office 2,742,158
Patented Apr. 17, 1956

2,742,158

PRESSURE FILTER WITH VIBRATING DEVICE FOR USE IN BACK WASHING OPERATION

Arthur A. Schuller, Chicago, Ill.

Application August 29, 1952, Serial No. 306,973

4 Claims. (Cl. 210—152)

The present invention relates generally to pressure filters. More particularly the invention relates to that type of pressure filter which is in the form of a self-contained unit and as its principal parts or components comprises: (1) a vertically elongated tank which is supported in an elevated position by way of a frame and consists of a continuous side wall, a fixed bottom wall at the lower end of the side wall, and a removable cover at the upper end of the side wall; (2) a horizontal plate which extends across the tank side wall at a point a small distance beneath the cover and serves to divide the interior of the tank into a lower compartment and an upper compartment; (3) a plurality of vertically extending laterally spaced porous filter elements which are connected to, and depend from, the horizontal plate and establish communication between the two compartments; (4) a valve equipped supply conduit which leads to, and communicates with, the lower compartment in the tank and is adapted when its valve is open to deliver the liquid to be filtered so that it flows into the lower compartment and then upwards through the filter elements into the upper compartment; (5) a valve equipped discharge conduit which leads from, and communicates with, the upper compartment and is adapted when its valve is open to conduct the filtered liquid or filtrate from the upper compartment; and (6) a valve equipped drain pipe which is connected to, and leads from, the bottom wall of the tank and is adapted when its valve is opened after a liquid filtering operation to drain any residual liquid from the tank interior.

As a preliminary to use of a pressure filter of the aforementioned type it is customary to provide the porous filter elements which depend from the horizontal plate with continuous coatings of pulverulent filter aid, such, for example, as diatomaceous earth. This is accomplished by introducing a predetermined quantity of the filter aid into a body of liquid and then delivering the liquid under pressure through the supply conduit so that after passing through the lower compartment it flows upwards through the porous filter elements into the upper compartment and then is discharged via the discharge conduit. In connection with up-flow of the liquid through the filter elements the filter aid becomes deposited on the exteriors of the elements and forms coatings which assist the elements in filtering foreign material from the liquid to be filtered during a filtering operation. After the filter has been used for filtering purposes to such an extent that the filter aid coatings on the exteriors of the filter elements become clogged it is necessary to remove the coatings and then replace them in order to restore the filter to normal efficiency. Removal of the filter aid coatings is accomplished by first opening the valve in the drain pipe and then supplying back washing liquid under pressure through the discharge conduit into the upper compartment to the end that the liquid flows downwards through the filter elements and then after flowing through the lower compartment is discharged via the drain pipe. In practice it has been found that in connection with a back washing operation the back washing liquid which flows downwards through the porous filter elements does not, in the majority of instances, break loose and remove all of the filter aid coatings from the exteriors of the filter elements. If all portions of the filter aid coatings are not removed the filter, when reconditioned by the application of new filter aid coatings to the filter elements, has comparatively low efficiency and does not function in the desired manner.

The principal object of this invention is to provide a pressure filter having simple and novel means whereby, in connection with a back washing operation, removal of all portions of the clogged filter aid coatings on the exteriors of the filter elements is acomplished to the end that the filter, when reconditioned for subsequent use by the application of new filter aid coatings to the filter elements, will possess maximum efficiency. Generally speaking such means comprises a vibrating device which is mounted on the tank and operates in connection with a back washing operation so to vibrate the back washing liquid and the various parts or components of the filter as to cause complete removal of the clogged filter aid coatings from the exteriors of the porous filter elements.

Another object of the invention is to provide a pressure filter of the last mentioned character in which the vibrating device for assisting the back washing liquid in removing clogged filter aid coatings from the exteriors of the filter elements is in the form of an electric vibratory horn which is mounted on the removable cover of the tank and operates when energized during a back washing operation to vibrate the back washing liquid by directly imparting rapid and pronounced impulses thereto.

A further object of the invention is to provide a pressure filter which is generally of new and improved construction and possesses extremely high efficiency.

Other objects of the invention and the various advantages and characteristics of the present filter will be apparent from a consideration of the following detailed description.

The invention consists in the several novel features which are hereinafter set forth and are more particularly defined by claims at the conlusion hereof.

In the drawings which accompany and form a part of this specification or disclosure and in which like numerals of reference denote corresponding parts throughout the several views:

Figure 3 is an enlarged vertical section taken on the line 3—3 of Figure 1 and illustrating in detail the construction and design of the tank and the manner of mounting of the vertically extending laterally spaced porous filter elements;

Figure 4 is a view partly in side elevation and partly in longitudinal section of one of the filter elements;

Figure 5 is a longitudinal section of the filter element that is illustrated in Figure 4;

Figure 6 is a fragmentary plan view of the filter element of Figures 4 and 5;

Figure 7 is a horizontal section on the line 7—7 of Figure 5;

Figure 8 is an enlarged plan view showing the electric vibratory horn without its housing;

Figure 9 is a section taken on the line 9—9 of Figure 8 and illustrating in detail the construction, arrangement and manner of mounting of the electric vibratory horn that constitutes the vibrating device of the filter.

Figure 1:
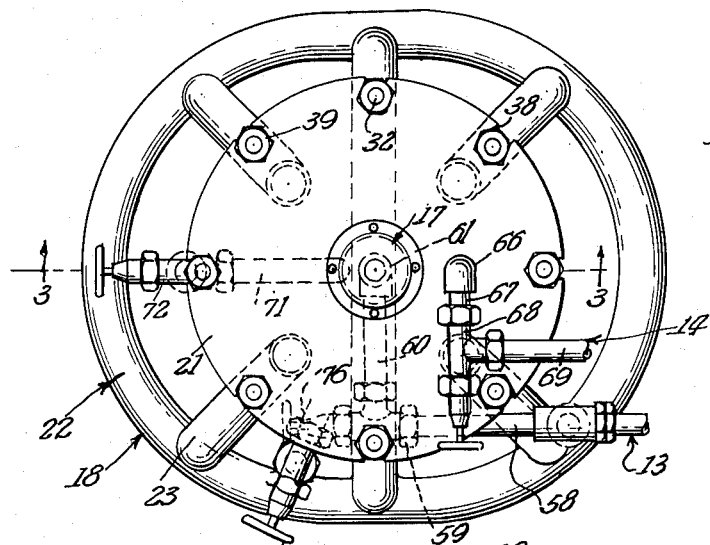
Figure 1 is a plan view of a pressure filter embodying the invention.

The filter which is shown in the drawings constitutes the preferred form or embodiment of the invention. It is a so-called pressure type filter and serves as a medium or instrumentality for removing foreign matter or material from liquid while the latter flows under pressure through it. As its principal components the filter comprises a tank 10, a horizontal composite plate 11, a plurality or group of filter elements 12, a supply conduit 13, a discharge conduit 14, a drain pipe 15, an air pipe 16, and a vibrating device 17. These parts are in connected relation as hereinafter described in order that the filter as a whole is in the form of a self-contained unit.

Figure 2:
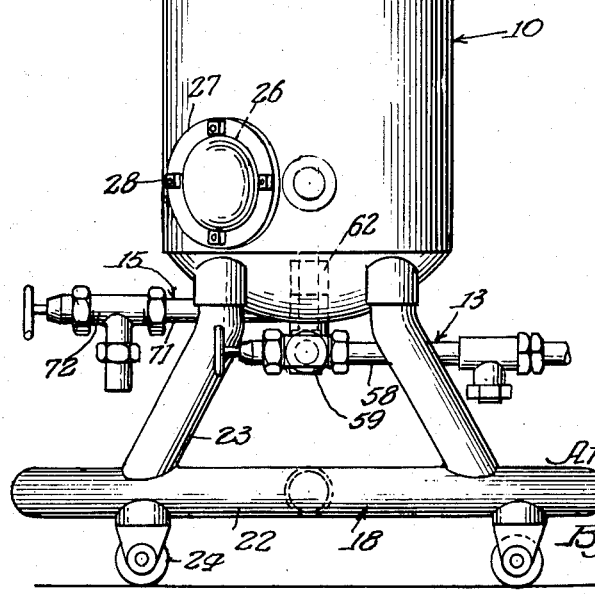
Figure 2 is a side view.

The tank 10 is vertically elongated and has associated with it a frame 18 for supporting it in an elevated position with respect to the floor or foundation of the establishment in which the filter is employed. It is adapted to have the liquid to be filtered flow upwards through it and comprises a continuous side wall 19, a fixed bottom wall 20, and a removable cover 21. The frame 18 for supporting the tank 10 in an elevated position is formed of metallic tubes and consists of a circular horizontally extending member 22 and a series of inclined equidistantly spaced leg-like members 23. The circular member 22 of the frame 18 is located a small distance beneath the bottom wall 20 of the tank and has depending casters 24 secured to different portions thereof in order that the frame together with the filter may be readily transported or moved from place to place. The lower ends of the leg-like members 23 are welded or otherwise fixedly connected to portions of the circular member 22 and the upper ends of the members 23 are suitably connected to the bottom wall 20 of the tank. The continuous side wall 19 of the tank is cylindrical and has at the upper end thereof an angle type ring 25. The tank formed of any suitable metal, such as stainless steel, and embodies in its lower end a circular opening 26 whereby access may be had to the lower portion of the interior of the tank. As shown in Figure 2 of the drawings the opening 26 is closed by a circular, gasket-equipped plate 27 which is removably secured in place by means of bolts 28. The angle type ring 25 at the upper end of the tank side wall 19 is formed of metallic stock and consists of a horizontally extending part 29 and a vertically extending part 30. The inner margin of the horizontally extending part 29 rests on, and is welded to, the upper end of the side wall 19. The vertically extending part 30 of the ring 25 projects above the horizontally extending part 29 and has its lower margin formed integrally with the outer margin of the part 29. The ring 25 has a twofold purpose in that it reenforces the tank side wall 19 and forms a support for the horizontal composite plate 11. The fixed bottom wall 20 of the tank 10 is downwardly bulged or dished. It is formed of the same type of metal as the tank side wall and has its outer marginal portion in abutting and welded relation with the lower end of the tank side wall. The removable cover 21 of the tank is in the form of a flat circular metallic plate and when in its operative position overlies, and is spaced a small distance above, the angle type ring 25 at the upper end of the tank side wall 19. It is of slightly greater diameter than the ring and rests on an annular horizontally extending gasket 31. The latter is formed of molded vulcanized rubber or like material and is arranged so that its lower portion is snugly confined within the upper marginal portion of the vertically extending part 30 of the ring 25. The cover 21 is removably secured in place by way of an annular series of equidistantly spaced eye-bolts 32. Such bolts consists of circular eyes 33 and shanks 34. The eyes 33 are connected to certain ends of the bolts and loosely surround horizontally extending pivot pins 35 in order that the bolts may be swung upwards and downwards into and out of operative relation with the cover 21 of the tank. The pivot pins are supported by way of pairs of spaced apart brackets 36 which are connected to, and project outwards from, the upper end of the tank side wall 19. As best shown in Figure 3 of the drawings, the ends of the pivot pins extend through aligned holes 37 in the outer end portions of the brackets 36. The free ends of the shanks 34 of the eye-bolts are adapted to fit within radially extending notches 38 in the outer marginal portion of the cover 21 and are provided on their extremities with nuts 39 for clamping the cover against the upper portion of the annular horizontally extending gasket 31. When it is desired to remove the cover the nuts 39 are loosened and then the eye-bolts are swung outwards and downwards away from the cover. When it is desired to secure the cover in place the eye-bolts are swung upwards and inwards in order to bring the free ends of the shanks thereof into the notches 38. Thereafter the nuts 39 are tightened in order to bring the outer marginal portion of the cover into clamped relation with the upper portion of the gasket 31.

The horizontal composite plate 11 is located at the upper end of the tank 10 and consists of a circular lower member 40 and a circular upper member 41. Preferably these members are formed of stainless steel like the side and bottom walls of the tank. The lower member 40 is of greater diameter than, and extends across the upper end of, the tank side wall 19 and is arranged so that its outer marginal portion fits loosely within the vertically extending part 30 of the angle type ring 25, rests on the inwardly and horizontally extending part 29 of the ring, and underlies the lower portion of the annular gasket 31. The upper member 41 of the composite plate 11 is positioned a small distance above the lower member 40. It is slightly smaller in diameter than the lower member and is arranged so that its periphery is in firm abutment with the inner side portion of the annular gasket 31. Vertically extending bolts 42 serve to hold the upper and lower members 40 and 41 of the plate 11 in connected relation. The shanks of these bolts extend through circular holes 43 in the outer marginal portion of the upper member 41 into screw threaded sockets 44 in the outer marginal portion of the lower member 40. The composite plate 11 divides the interior of the tank 10 into a large sized lower compartment 45 and a small sized upper compartment 46. The upper end of the lower compartment 45 is defined by the bottom surface of the lower member 40 and the lower end of the upper compartment 46 is defined by the top surface of the upper member 41. When the filter is in operation the liquid to be filtered flows first through the lower compartment and then through the upper compartment as described hereafter.

The filter elements 12 of the filter are disposed for the most part in the lower compartment 45 and establish communication between such compartment and the upper compartment 46. They are vertically elongated and depend from the horizontal composite plate 11. It is contemplated that the elements will be sufficiently numerous to fill the lower compartment to a substantial extent and that they will be spaced laterally and equidistantly apart. Each of the filter elements 12 comprises a vertically extending open ended tube 47, an annular series of equidistantly spaced, vertically extending spacer rods 48 around the tube 47 and a vertically extending tubular wire screen 49 around the rods 48. The tubes 47 are preferably formed of the same metal as the side and bottom walls of the tank 10 and are imperforate except for their upper and lower ends. The upper ends of the tubes extend through circular holes 50 in the lower member 40 of the horizontal composite plate 11 and are provided with fixed angle type mounting rings 51. The latter are of one-piece character and consist of vertically extending parts 52 and horizontally extending parts 53. The vertically extending parts 52 surround, and are preferably welded to, the upper ends of the tubes 47 and have the upper ends thereof connected to the inner marginal portions of the horizontally extending parts 53. The last mentioned parts are imperforate and abut flatly against the bottom surface of the upper member 41 of the plate 11. Annular gaskets 54 extend around the vertically extending parts 52 of the mounting rings 51 and are interposed between the horizontally extending parts 53 and the portions of the lower member 40 that define the holes 50. Such gaskets are compressed vertically when the bolts 42 are tightened and serve to prevent leakage of liquid into the space between the lower and upper members of the composite plate 11. The upper ends of the tubes 47 communicate with the upper compartment 46 in the tank 10 by way of circular holes 55 which are formed in the upper member 41 and are concentrically positioned with respect to the holes 50 in the lower member 40. The vertically extending rods 48 of the filter elements 12 are welded to the outer peripheries of the tubes 47 and define between them vertically extending channels 56. They are so positioned and of such length that the lower ends thereof terminate adjacent the lower ends of the tubes 47 and the upper ends thereof terminate a small distance beneath the angle type mounting rings 51. The vertically extending tubular wire screens 49 extend snugly around the outer portions of the spacing rods 48 and are arranged so that their lower ends project a small distance between the lower ends of the tubes 47. The upper ends of the screens are bent inwards and then upwards and are welded to the portions of the tubes 47 that are directly above the upper ends of the spacing rods 48. The lower ends of the screens are closed by inverted cup-shaped members 57 which are in the form of imperforate sheet metal stampings and are welded or otherwise fixedly secured in place. When the filter is in operation the liquid to be filtered, after flowing into the lower compartment 45, flows inwards through the interstices of the screens 49, then flows downwards through the vertically extending channels 56 between the spacing rods 48, then flows around and into the lower ends of the tubes 47 and finally flows upwards through the tubes 47 into the upper compartment 46. The lower ends of the filter elements 12 terminate a small distance above the inner surface of the bottom wall 20 of the tank 10. It is contemplated that in connection with a filtering operation the screens 49 will be provided with continuous coatings of pulverulent filter aid, such as diatomaceous earth. The purpose of the coatings is to assist the screens in filtering out foreign matter from the liquid as the latter flows through the filter elements.

The supply conduit 13 serves as a medium for supplying the lower compartment 45 with the material to be filtered and comprises a horizontal pipe 58, a hand valve 59, a horizontal pipe 60, an elbow 61, and a vertically extending pipe nipple 62. The pipe 58 is located beneath the tank 10 and has one end thereof connected to a pressure source of the liquid to be filtered. Such source may be a slurry tank (not shown) and a motor driven pump (also not shown) between the slurry tank and said one end of the pipe 58. The other end of such pipe communicates with, and is connected to, the inlet of the casing of the hand valve 59. As shown in Figures 1 and 2, the hand valve is located under one side portion of the downwardly dished bottom wall 20 of the tank 10. The horizontal pipe 60 extends between, and is connected to, the outlet of the casing of the valve 29 and one end of the elbow 61. The vertically extending nipple 62 extends upwards through a suitably sealed hole 63 in the central portion of the tank bottom wall 20 and has its lower end connected to the other end of the elbow 61. The upper portion of the nipple has cross ports 64 for introducing liquid to be filtered into the lower compartment 45 in the tank. When the hand valve 59 is open the liquid to be filtered flows under pressure through the supply conduit 13 into the lower compartment 48. At the conclusion of a filtering operation it is contemplated that the hand valve 59 forming part of the supply conduit 13 will be closed.

The discharge conduit 14 is located above the tank 10 and comprises a vertically extending pipe nipple 65, an elbow 66, a horizontally extending pipe nipple 67, a hand valve 68, and a horizontally extending pipe 69. The lower end of the vertically extending pipe nipple 65 extends through and is connected by a screw thread connection to, a hole 70 in the removable cover 21 of the tank 10 and communicates with the upper compartment 46. The upper end of the nipple 65 is connected to one end of the elbow 66. The horizontally extending pipe nipple 67 extends between, and is connected to, the other end of the elbow 66 and the inlet of the casing of the hand valve 68. The horizontally extending pipe 69 has one end thereof connected to the outlet of the casing of the hand valve 68. The other end of the pipe 69 serves to discharge the filtered liquid or filtrate to any desired point. The discharge conduit 14 serves not only to effect discharge of the filtered liquid from the tank, but also to permit back washing liquid under pressure to be introduced into the upper compartment 46 when it is desired to remove clogged filter aid coatings from the filter elements 12 after use of the filter.

The drain pipe 15 is located beneath the tank 10 and comprises a horizontally extending pipe nipple 71 and a hand valve 72. One end of the pipe nipple 71 communicates with the lower portion of the lower compartment 45 by way of a hole 73 in the tank bottom wall 20 and is suitably connected to the hole defining portion of the bottom wall of the tank. The other end of the horizontally extending pipe nipple 71 is connected to the inlet of the casing of the valve 72. Such valve is arranged so that the outlet of the casing thereof faces downwards and serves when in its open position to drain liquid from the interior of the tank.

The air pipe 16 is disposed adjacent the upper end of the tank 10 and comprises a flexible conduit 74, a hand valve 75 and a horizontally extending pipe nipple 76. The flexible conduit 74 has one end thereof connected to any suitable source (not shown) of air under pressure. The other end of the flexible conduit is connected to the inlet of the casing of the hand valve 75. The horizontally extending pipe nipple 76 of the air pipe extends between, and is connected to, the outlet of the casing of the valve 75 and a hole in the upper end of the tank side wall 19. The air pipe may be used either to supply air under pressure into the tank at the conclusion of a filtering operation in order to cause the liquid in the lower compartment 45 to flow upwards through the filter elements for discharge via the discharge conduit 14 or when the drain pipe is opened after application of filter aid coatings to the filter elements to supply air under pressure to the lower compartment 45 in order to dry or effect caking of the filter aid coatings.

In connection with use of the filter a predetermined quantity of filter aid is introduced into a body of liquid. Thereafter the liquid with the filter aid therein is introduced under pressure through the supply conduit 13 into the lower compartment 45 in the tank. Such liquid, after being introduced into the lower compartment, flows through the filter elements to the upper compartment 46 and is then discharged via the discharge conduit 14. In connection with flow of the liquid through the screens 49 of the filter elements the filter aid is deposited on the outer surfaces of the screens and builds up continuous coatings thereon. After the coatings have been built up to the desired extent the hand valve 59 of the supply conduit 13 is closed and then the hand valve 72 of the drain pipe 15 is opened so as to drain the tank interior. In connection with draining of the tank by way of the drain pipe 15 air under pressure may, if desired, be introduced into the upper portion of the lower compartment 45 by opening the hand valve 75 of the air pipe. The air under pressure that is introduced into the upper compartment serves to expedite draining of the liquid from the lower compartment and also to dry the filter aid coatings on the filter elements. After the filter aid coatings are formed on the filter elements the valve 72 of the drain pipe 15 and the valve 75 of the air pipe 16 are closed. Thereafter the hand valves 59 and 68 are opened and the liquid to be filtered is circulated through the tank. In connection with circulation of the liquid to be filtered through the tank the foreign matter or material in the liquid is removed as the liquid flows through the filter aid coatings and the screens 49. At the conclusion of a filtering operation the residual liquid in the tank may be removed either by way of the drain pipe 15 or introducing air under pressure into the lower compartment 45 by way of the air pipe 16. In the event that the filter aid coatings around the screens 49 of the filter elements become clogged the valve 72 of the drain pipe 15 is opened and back washing liquid under pressure is introduced into the upper compartment 46 by way of the discharge conduit 14. The back washing liquid, after flowing downwards through the tubes 47 and then upwards through the vertically extending channels 56 between the spacing rods 48, flows laterally through the screens 49 and thus effects removal of the coatings from the screens. Because of the particular design and construction of the filter elements complete removal of all portions of the clogged filter aid coatings generally does not occur by a back washing operation alone and it is for this reason that the filter as a whole includes as one of its components the vibrating device 17.

The vibrating device 17 is mounted on the removable cover 21 of the tank 10 and operates in connection with a back washing operation so to vibrate the back washing liquid and the various parts or components of the filter as to cause complete removal of the clogged filter aid coatings from the exteriors of the porous filter elements 12. It is in the form of an electric vibratory horn and comprises a mounting ring 77, a bracket structure 78, a coil 79, a series of inverted U-shaped laminations 80, a core piece 81, a vibrator diaphragm 82 and a vibration dispersing diaphragm 83. The mounting ring 77 overlies the central portion of the top surface of the removable cover 21 and surrounds a large sized circular hole 84 in the central portion of the cover. It is removably secured in place by an annular series of vertically extending equidistantly spaced screws 85 which extend downwards through holes in the mounting ring into threaded sockets 86 in the portion of the cover that defines the hole 84. The bracket structure 78 extends across the mounting ring 77 and consists of a pair of laterally spaced inverted U-shaped brackets 87, the ends of which are welded or otherwise fixedly secured to different portions of the mounting ring. The coil 79 is formed of copper wire and is disposed between, and depends from, the central portions of the brackets 87. It is supplied with electric current by way of conductors (not shown) and serves when energized vertically to vibrate the core piece 81. The laminations 80 fit between, and depend from, the central portions of the brackets 78 and are arranged in straddled relation with the coil 79. The core piece 81 underlies the coil and is operatively connected to the central portion of the vibrator diaphragm 82 by way of a vertically extending bolt 88. A washer 89 is interposed between the central portions of the core piece and the vibrator diaphragm. Such washer surrounds the shank of the bolt 88 and so spaces the core piece from the diaphragm as to prevent the former from interfering with vibratory movement of the latter. The vibrator diaphragm extends across the upper end of the hole 84 and has its outer marginal portion arranged so that it fits and is clamped between the mounting ring 77 and the portion of the tank cover 21 that defines the hole 84. When the coil 79 is energized the core piece 81 vibrates vertically and causes up and down vibratory movement of the vibrator diaphragm. Such movement on the part of the diaphragm causes the tank and filter elements to vibrate because the vibrator diaphragm is mechanically connected to the cover. It also causes or sets up a siren type noise, the vibrations of which are transmitted to the back washing liquid by way of the dispersing diaphragm 83 as hereinafter described. Beneath the central portion of the vibrator diaphragm 81 are a spacing washer 90 and a stiffening washer 91. These two washers surround the shank of the bolt 88 and are disposed in the large sized hole 84 in the central portion of the removable cover 21. The vibration dispersing diaphragm 83 extends across the lower end of the hole 84 and has its marginal portion interposed between a ring 92 and the superjacent portion of the tank cover 21. The ring 92 is of materially greater diameter than the hole 84 and is positioned concentrically with respect to the hole. It is secured in place by vertically extending screws 93 which extend upwards through holes 94 in the ring 92 into screw threaded sockets 95 in the cover. An annular gasket 96 of any suitable compressible material is interposed between the portion of the diaphragm 83 that is directly inwards of the ring 92 and the hole defining portion of the removable cover 21. This gasket serves to prevent liquid in the upper compartment 46 from flowing past the vibration dispersing diaphragm 83 into the large sized hole 84. When the vibrating device 17 is in operation the noise vibrations which are caused by rapid up and down vibration of the vibrator diaphragm 82 are transmitted via the air in the large sized hole 84 to the vibration dispersing diaphragm 83, and cause the latter to vibrate in such manner that it imparts rapid impulses to the back washing liquid in the tank interior. In addition to the parts heretofore mentioned the vibrating device 17 comprises an inverted cup-shaped housing 97 for protecting and enclosing the parts of the device that are above the hole 84 in the central portion of the tank cover 21. The housing 97 is preferably in the form of a one-piece sheet metal stamping and embodies on the lower end of its side wall an outwardly extending integral flange 98 which extends around the mounting ring 77 and is removably secured in place by screws 99 which extend through screw threaded sockets in the subjacent portion of the tank cover 21. If desired the housing may be covered interiorly or exteriorly with any suitable sound absorbing material in order to reduce the intensity of the siren type noise that is created in connection with operation of the vibrating device.

In connection with a back washing operation to effect removal of clogged filter aid coatings from the porous filter elements 12 it is contemplated that as soon as the back washing liquid is introduced into the upper compartment 46 the vibrating device 17 will be placed in operation by supplying electric current to the coil 79. As soon as the device is in operation vibrations are imparted to the filter elements 12 via the tank cover 21, the tank side wall 19 and the composite plate 11. In addition rapid and pronounced impulses are imparted to the back washing liquid by the vibration dispersing diaphragm 83. As the result of vibration of the filter elements and transmission of impulses to the back washing liquid the clogged filter aid coatings on the porous filter elements 12 readily become released from the screens of the filter elements. Because the filter includes the vibrating device 17 quick and complete removal of the filter aid coatings may be effected in connection with each back washing operation. At the conclusion of the back washing operation the filter aid material which remains in the lower compartment 45 may be removed via the circular opening 26 after removal of the circular, gasket-equipped plate 27.

The herein described filter effectively and efficiently fulfills its intended purpose and, due to the fact that it includes the vibrator device 17, possesses high efficiency. The vibrating device increases the cost of the filter but a small amount and makes it possible quickly and completely to remove the clogged filter aid coatings from the screens of the porous filter elements during a normal back washing operation.

The invention is not to be understood as restricted to the details set forth since these may be modified within the scope of the appended claims without departing from the spirit and scope of the invention.

Having thus described the invention what I claim as new and desire to secure by Letters Patent is:

1. In a filter of the type that is adapted to remove foreign material from liquid under pressure and comprises a tank having a plate extending across its interior and dividing the latter into a first compartment and a second compartment and also having a hole therethrough leading to the second compartment, a plurality of spaced apart porous filter elements disposed for the most part in the first compartment, adapted to be covered with pulverulent filter aid coatings, and connected to the plate in such manner that they establish communication between the two compartments, means operative in connection with a filtering operation to cause the liquid to be filtered to flow under pressure into the first compartment, then through the filter aid coatings and the filter elements and into the second compartment and finally from said second compartment and embodying a valve-equipped supply conduit leading to the first compartment and a discharge conduit leading from the said second compartment, and means adapted for use after a filtering operation, including said discharge conduit, and operative to supply back washing liquid under pressure so that it flows first into the second compartment and then through the filter elements into the first compartment and causes removal of the filter aid coatings from the filter elements; means operative to assist the back washing liquid in removing the filter aid coatings from the filter elements and embodying a laterally flexible diaphragm extending across, and serving to close, the aforesaid hole and arranged so that one side thereof is exposed to the interior of the second compartment, and a device mounted on the tank adjacent to the other side of the diaphragm and adapted during operation thereof rapidly to flex the diaphragm back and forth so that it imparts impulses to the back washing liquid in the second compartment and the filter elements.

2. In a filter of the type that is adapted to remove foreign material from liquid under pressure and comprises a tank having a plate extending across its interior and dividing the latter into a first compartment and a second compartment and also having a hole therethrough leading to the second compartment, a plurality of spaced apart porous filter elements disposed for the most part in the first compartment, adapted to be covered by pulverulent filter aid coatings, and connected to the plate in such manner that they establish communication between the two compartments, means operative in connection with a filtering operation to cause the liquid to be filtered to flow under pressure into the first compartment, then through the filter aid coatings and the filter elements and into the second compartment and finally from said second compartment and embodying a valve-equipped supply conduit leading to the first compartment and a discharge conduit leading from the second compartment, and means adapted for use after a filtering operation, including said discharge conduit and a valve-equipped drain conduit leading from the bottom of the first compartment, and operative to supply back washing liquid under pressure so that it flows first into the second compartment and then through the filter elements and into the first compartment and causes removal of the filter aid coatings from the filter elements; means operative to assist the back washing liquid in removing the filter aid coatings from the filter elements and embodying a laterally flexible diaphragm extending across, and serving to close, the aforesaid hole in the tank and arranged so that one side thereof is exposed to the interior of the second compartment, and an electrically actuated device mounted on the tank adjacent to the other side of the diaphragm and arranged so that upon actuation thereof it rapidly flexes the diaphragm back and forth so that it in turn imparts impulses to the back washing liquid in the second compartment and the filter elements.

3. In a filter of the type that is adapted to remove foreign material from liquid under pressure and comprises a tank embodying a continuous side wall, a bottom wall and a removable cover with a hole therethrough, a horizontal plate extending across the tank side wall at a point a small distance beneath the cover and dividing the tank interior into a lower compartment and an upper compartment, a plurality of spaced apart vertically extending porous filter elements connected to, and depending from, the plate, adapted to be covered with pulverulent filter aid coatings, and serving to establish communication between the two compartments, means operative to cause in connection with a filtering operating the liquid to be filtered to flow under pressure into the lower compartment, then through the filter aid coatings and the filter elements and into the upper compartment and finally from said upper compartment and embodying a valve-equipped supply conduit leading to the lower compartment and a discharge conduit leading from the upper compartment, means adapted for use after a filtering operation, including said discharge conduit and a valve-equipped drain conduit leading from the bottom of said lower compartment, and operative to supply back washing liquid under pressure so that it flows first into the upper compartment and then through the filter elements and into the first compartment and causes removal of the filter aid coatings from the elements; means operative to assist the back washing liquid in removing the filter aid coatings from the filter elements and embodying a laterally flexible diaphragm extending across, and serving to close the hole in the cover and having the bottom surface thereof exposed to the interior of the upper compartment, and an electric device mounted on the cover above the diaphragm and operative upon actuation thereof rapidly to flex said diaphragm back and forth so that it imparts impulses to the back washing liquid in said upper compartment and filter elements.

4. A filter according to claim 3 and wherein the electric device is in the form of a vibratory horn which embodies a movable core and a diaphragm type part which is connected to the core and the hole defining portion of the cover, is disposed a small distance outwards from the diaphragm that is exposed to the interior of the upper compartment, and operates in connection with actuation of the horn not only to flex said diaphragm back and forth but also to vibrate the tank, plate and filter elements.

References Cited in the file of this patent

UNITED STATES PATENTS

| Number | Name | Date |
|---|---|---|
| 1,662,180 | Ball | Mar. 13, 1928 |
| 2,068,099 | Engle | Jan. 19, 1937 |
| 2,180,189 | Alvord | Nov. 14, 1939 |
| 2,498,292 | Naugle | Feb. 21, 1950 |
| 2,562,699 | Cooperson et al. | July 31, 1951 |
| 2,568,085 | Naugle | Sept. 18, 1951 |
| 2,578,636 | Smith et al. | Dec. 11, 1951 |
| 2,600,458 | Ackley et al. | June 17, 1952 |
| 2,601,156 | Lax | June 17, 1952 |
| 2,605,903 | Schuller | Aug. 5, 1952 |

FOREIGN PATENTS

| Number | Country | Date |
|---|---|---|
| 356,783 | Great Britain | Sept. 10, 1931 |